R. J. F. & A. E. ALDRED.
DOUGH HANDING MACHINE.
APPLICATION FILED JAN. 28, 1913.

1,087,564.

Patented Feb. 17, 1914.

Witnesses:
Margaret Havin
Wm. J. Singer

Inventors
Robert J. F. Aldred
Alfred E. Aldred
By their Attorney

UNITED STATES PATENT OFFICE.

ROBERT J. F. ALDRED AND ALFRED E. ALDRED, OF GLENCOE, ONTARIO, CANADA, ASSIGNORS TO JOHN JABURG AND HIGO JABURG, COMPOSING THE FIRM OF JABURG BROS., OF NEW YORK, N. Y.

DOUGH-HANDING MACHINE.

1,087,564.     Specification of Letters Patent.     Patented Feb. 17, 1914.

Application filed January 28, 1913. Serial No. 744,645.

*To all whom it may concern:*

Be it known that we, ROBERT J. F. ALDRED and ALFRED E. ALDRED, residents of the town of Glencoe, Province of Ontario, Canada, have invented certain new and useful Improvements in Dough-Handing Machines, of which the following is a specification.

Our invention relates to dough handling machines and it consists, primarily, in providing means whereby the outer face of the skin, of the portion of dough under treatment, may be stretched at the same time, and substantially as often, as the inner face of that skin is stretched.

The main features of the machine are already described in our Patent 993138. In that, a disk D whose outer face is shown as beveled inwardly, is repeatedly brought against the inner face of the portion of dough under treatment and the skin of that portion is stretched and its body compressed, in imitation of hand kneading, but we find that for a closer imitation of the hand kneading it is desirable that, to secure the best results, there should be a stretching of that part of the skin opposite to the part in contact with the disk, at substantially the same instant, and that that stretching should occur as often as the disk stretching, also that in a machine of ordinary size and rapid action, this double stretching should continue throughout as great a part of the circle of the machine as possible, in order that it may occur a sufficient number of times to effect the desired result, during one trip of the dough through the machine. A stretcher and tucker extending from the charging point to the discharging point would not have sufficient inclination to satisfactorily accomplish such stretching and tucking, but we have devised a machine in which a series of stretchers and tuckers are arranged, each one preferably overlapping the succeeding one, and by such device, in combination with the disk tucker, we have successfully accomplished the simultaneous and repeated double stretching and tucking which is required to produce the results attained by hand kneading.

Figure 1:
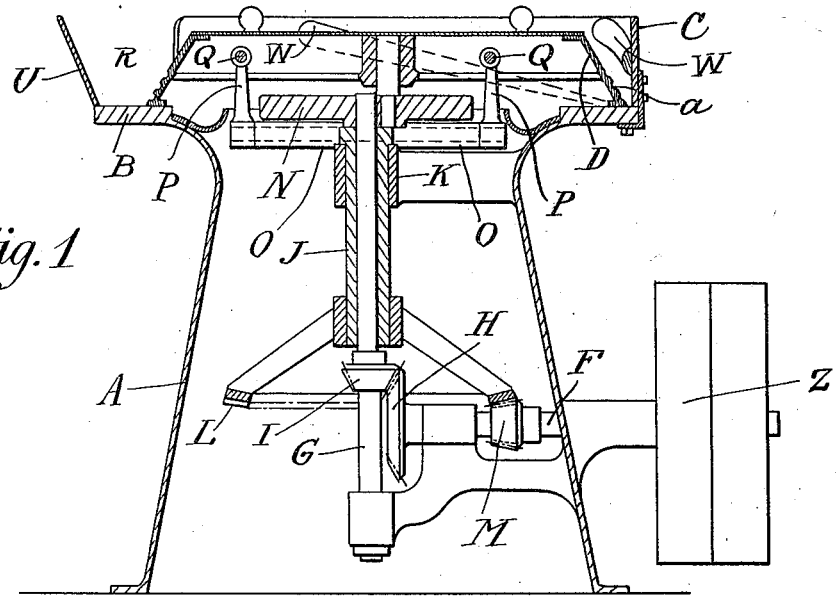
Figure 2:
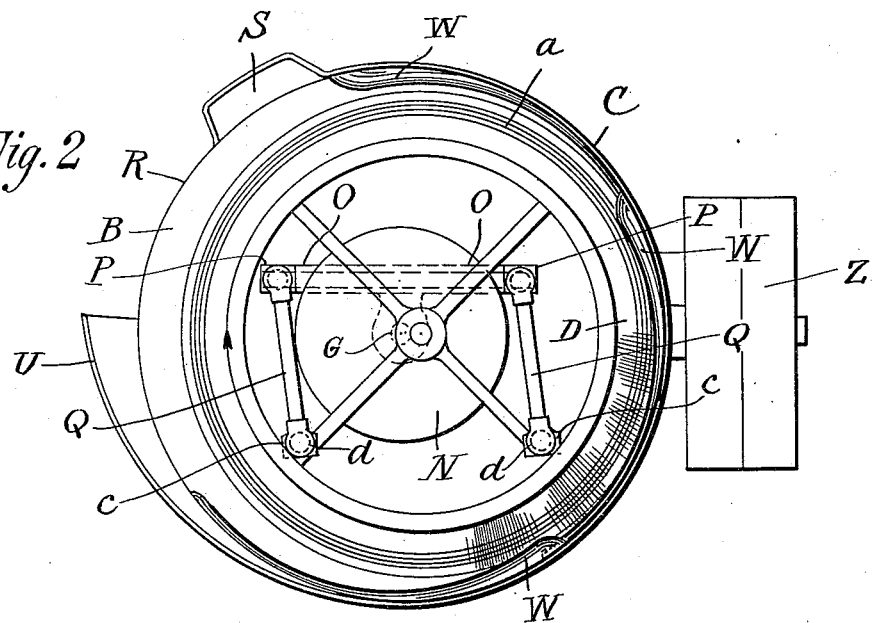

Figure 1, is a central, vertical, sectional view of a machine embodying our invention. Fig. 2 is an upper plan view of said machine.

There is first, a suitable frame or pedestal A, adapted to inclose the gears and to support the kneading table or board B. This table is preferably in the form of a flat annular disk whose inner diameter is such that the kneading disk will always project over the inner edge and of a width slightly greater than the throw of that disk. In said frame A, we mount an upright shaft G, provided with a bevel pinion I which meshes with a bevel gear H on a horizontal shaft F, also supported in frame A and provided with a belt pulley Z. The upper end of shaft G carries a crank disk N, from which a wrist pin projects upward and upon it the disk D, is centrally journaled. Shaft G is surrounded by a sleeve J, the upper part of which is journaled in the bearing K supported in frame A, and on said sleeve J, we mount a bevel gear L, much larger than I, meshing with a small bevel gear M, which is also secured to shaft F. The result of such arrangement is that the shaft G will turn much faster than the sleeve J. This sleeve J, at the upper end, is provided with reversely extending arms O from which, on opposite sides of the center, arms P extend upwardly, their upper ends being connected to pins c on disk D by links, Q, the connection with P being swiveled and those with c, ball and socket joints d. Around the edge of the disk D, we mount a rim C, with a swell S, at the entrance, to permit the ready introduction of the dough and a flare U, and opening R for discharging it, the rim for the greater part of its length being set upright, as seen at the right of Fig. 1. To the inner side of this rim C, we secure the stretcher and tucker bars W, preferably three in number, inclined from a level near the top of the rim, to a level near the bottom of said rim, and, preferably, overlapping one over the next. They are preferably rounded, on their exposed faces, and the ends we find it desirable to construct of brass.

As will be manifest from a study of the machine, the turning of shaft F will turn shaft G and its crank disk N, carrying wrist pin b, around the axis of shaft G. At the same time, it will also turn sleeve J and its supported arms O. The result is that the disk D will be carried around in such a way that a point on its periphery will describe a figure, circular in the main, but having a series of inwardly curved scallops, each point indicating a thrust toward the rim C. Now as the disk D is thus thrust toward the rim, the walls of its corrugations *a* bear against the dough placed between, and stretch its outer skin and tuck it in at the bottom, just as a hand would do. At the same time the dough is thereby pressed against the tuckers, W, and being given a circular as well as a radial movement, will be carried along the face of the tucker and the inclination of the tucker will result in stretching the skin of the dough, on the side opposite to the disk, and tucking it in at the bottom on that side, thus accomplishing by machinery, simultaneously, the double, opposed stretching and tucking so long desired. If the inclination of the tucker was very slight, there would not be the balanced tucking which results from a greater inclination and if but one with a sufficient inclination, were used, the tucking would not occur often enough to properly knead a portion of dough in one trip through the machine. When arranged to overlap, as shown, the action of one tucker has scarcely ceased before another engages the dough, thus insuring that there shall be a tucker at whatever point the disk presents the dough and also insuring continuous repeated action during the operation of the disk, but not continuous tucking, since the alternate stretching, tucking then releasing and then stretching and tucking again, is a part of a proper kneading.

What we claim as our invention, and desire to secure by Letters Patent, is:—

1. In a dough hander, the combination of a pan, a beveled faced disk of less diameter supported therein, a series of tuckers inclined to the horizontal, arranged in sequence within the outer wall of the pan and inclined to the face thereof and means for operating the disk, substantially as set forth.

2. In a dough hander, the combination of a pan, a beveled faced disk of less diameter, supported therein, a series of tuckers inclined to the horizontal, arranged in sequence within the outer wall of the pan, one overlapping the next, and inclined to the face thereof, and means for operating the disk, substantially as set forth.

3. In a dough hander, the combination of a kneading board, a rim along said board, a series of tuckers arranged and rigidly secured in sequence within said rim and inclined to the face of the kneader board, a movable member with an inclined face and means for moving said movable member toward and along the inner face of said tucker.

4. In a dough handing machine the combination of a pan, a beveled faced disk of less diameter, supported therein, a series of tuckers, inclined to the horizontal and having their faces toward the dough trough bounded by curved lines, said tuckers being arranged in sequence within the outer wall of the pan and also inclined to the face thereof, and means for operating the disk, substantially as set forth.

Signed at Glencoe in the county of Middlesex and Province of Ontario, Canada, this twenty-third day of January A. D. 1913.

ROBERT J. F. ALDRED.
ALFRED E. ALDRED.

Witnesses:
W. D. Moss,
A. G. Ostrander.